US012333650B2

(12) United States Patent
Vasilkovskii et al.

(10) Patent No.: US 12,333,650 B2
(45) Date of Patent: Jun. 17, 2025

(54) THREE-DIMENSIONAL ASSET RECONSTRUCTION

(71) Applicants: Mikhail Vasilkovskii, London (GB); Sergey Demyanov, Brooklyn, NY (US); Vladislav Shakhrai, London (GB)

(72) Inventors: Mikhail Vasilkovskii, London (GB); Sergey Demyanov, Brooklyn, NY (US); Vladislav Shakhrai, London (GB)

(73) Assignee: Snap Inc., Santa Monica, CA (US)

(*) Notice: Subject to any disclaimer, the term of this patent is extended or adjusted under 35 U.S.C. 154(b) by 109 days.

(21) Appl. No.: 17/942,796

(22) Filed: Sep. 12, 2022

(65) Prior Publication Data

US 2024/0087229 A1 Mar. 14, 2024

(51) Int. Cl.
G06T 17/20 (2006.01)
G06T 7/73 (2017.01)
G06T 15/04 (2011.01)

(52) U.S. Cl.
CPC ............ G06T 17/20 (2013.01); G06T 7/74 (2017.01); G06T 15/04 (2013.01); G06T 2200/24 (2013.01); G06T 2207/30244 (2013.01)

(58) Field of Classification Search
CPC .......... G06T 17/20; G06T 15/04; G06T 7/74; G06T 2200/24; G06T 2207/30244
See application file for complete search history.

(56) References Cited

U.S. PATENT DOCUMENTS

| 2015/0178988 | A1* | 6/2015 | Montserrat Mora | ... G06T 17/20 345/420 |
| 2019/0132529 | A1* | 5/2019 | Ito | ............. G06T 1/0007 |
| 2019/0138786 | A1* | 5/2019 | Trenholm | ............. G06F 18/241 |
| 2020/0219272 | A1 | 7/2020 | Pizer et al. | |
| 2020/0372710 | A1* | 11/2020 | Wang | ............. B33Y 50/00 |
| 2022/0014722 | A1* | 1/2022 | Sugano | ............. G06T 13/40 |
| 2022/0026276 | A1* | 1/2022 | Harvill | ............. G01J 3/0289 |
| 2022/0101593 | A1* | 3/2022 | Rockel | ............. A63F 13/655 |
| 2022/0309708 | A1* | 9/2022 | Bhate | ............. G06T 7/20 |

OTHER PUBLICATIONS

De Paolis Lucio Tommaso et al: "Photogrammetric 3D Reconstruction of Small Objects for a Real-Time Fruition", Feb. 24, 2020 (Feb. 24, 2020), Topics in Cryptology—CT-RSA 2020: The Cryptographers' Track at the RSA Conference 2020, San Francisco, CA, USA, Feb. 24-28, 2020, pp. 375-394.

International Search Report and Written Opinion for International Application No. PCT/US2023/029068, dated Oct. 31, 2023 (Oct. 31, 2023)—10 pages.

* cited by examiner

Primary Examiner — Michelle Chin
(74) Attorney, Agent, or Firm — CM Law; Stephen J. Weed

(57) ABSTRACT

A three-dimensional asset (3D) reconstruction technique for generating a 3D asset representing an object from images of the object. The images are captured from different viewpoints in a darkroom using one or more light sources having known locations. The system estimates camera poses for each of the captured images and then constructs a 3D surface mesh made up of surfaces using the captured images and their respective estimated camera poses. Texture properties for each of the surfaces of the 3D surface mesh are then refined to generate the 3D asset.

20 Claims, 6 Drawing Sheets

THREE-DIMENSIONAL ASSET RECONSTRUCTION

TECHNICAL FIELD

Examples set forth in the present disclosure relate to generating a three-dimensional (3D) asset. More particularly, but not by way of limitation, the present disclosure describes an asset reconstruction technique that generates virtual representations (3D assets) from physical objects.

BACKGROUND

Augmented reality (AR) shopping and try-on allow brands to enhance user experience by bringing an asset directly to users and allowing them to seamlessly interact with the asset. According to consumer tests, interacting with 3D assets brings more conversion and engagement compared to conventional catalog-based shopping. Currently on the market, there are 3D asset generation engines that allow users to render and try-on assets fast even on mobile and edge devices (e.g., LensCore by Snap, Filament by Google, etc.). One of the remaining issues is that brands typically do not produce 3D assets as they release new goods. This is because creating such 3D assets requires time consuming manual work by 3D artists, which can take forty (40) or more hours per 3D asset reconstruction and many iterations with the brand owner. Furthermore, conventional automated solutions cannot achieve production quality without requiring time-consuming post-processing and refinement.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawings. When a plurality of similar elements is present, a single reference numeral may be assigned to like elements, with an added lower-case letter referring to a specific element. When referring to a non-specific one or more elements the lower-case letter may be dropped.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawings are the following figures.

DETAILED DESCRIPTION

Figure 1:
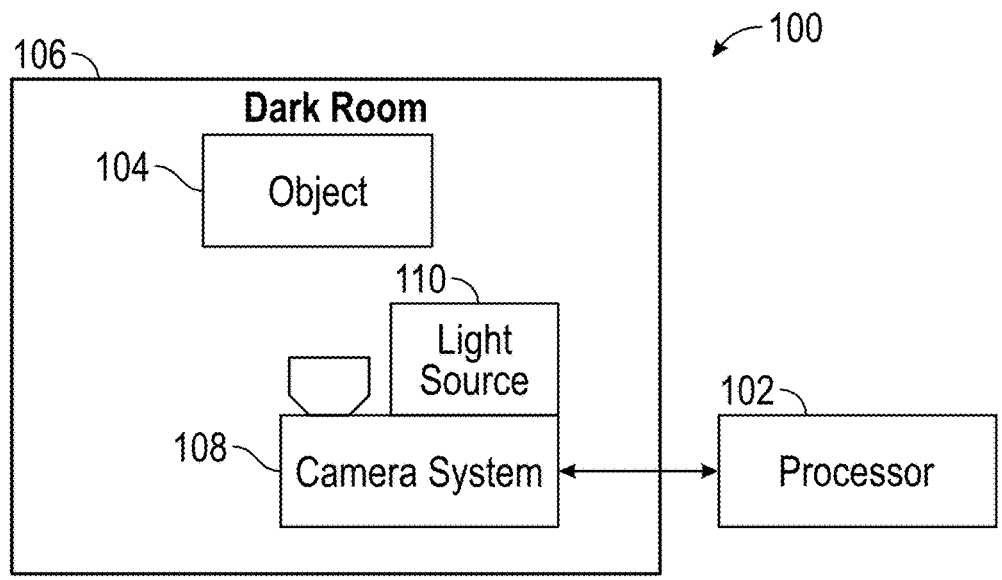
FIG. 1 is a block diagram of a 3D asset reconstruction system.

A 3D asset reconstruction technique for generating a 3D asset representing a physical object from images of the object. The images are captured from different viewpoints in a darkroom using one or more light sources having known locations. The technique estimates camera poses for each of the captured images and then constructs a 3D surface mesh made up of surfaces using the captured images and their respective estimated camera poses. Texture properties (e.g., one or more of reflectance, color, or roughness) for each of the surfaces of the 3D surface mesh are then refined to generate the 3D asset.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. An example 3D asset reconstruction system and method will be described with respect to FIGS. 1, 2A, 2B, 3, 4B, and 5.

FIG. 1 depicts an example 3D asset reconstruction system 100. The system 100 includes a computing system 102 configured to obtain images of an object 104 in a darkroom 106 with a camera system 108. The camera system 108 includes one or more cameras that capture images (raw images) of the object 104 from different viewpoints (e.g., a few hundred viewpoints). The camera system 108 may include one or more cameras that is/are movable to different locations within the darkroom 106 to capture different viewpoints, multiple cameras that are statically positioned within the darkroom 106 to capture different viewpoints, or a combination thereof. Each camera may be a conventional camera capable of capturing high resolution digital images. The computing system 102 can include any of the components of the machine 500 (FIG. 5), such as one or more processors.

A light source 110 illuminates the object and has a known location relative to each camera (or camera location) of the camera system 108. In one example, a respective light source 110 is coupled to each camera of the camera system 108, which facilitates determining the location of the light source 110 with respect to a captured image as the light source will have a known relationship to the camera. As used herein, the term darkroom refers to a room where substantially all of the light present in the room originates from a known source location(s).

Figure 2A:
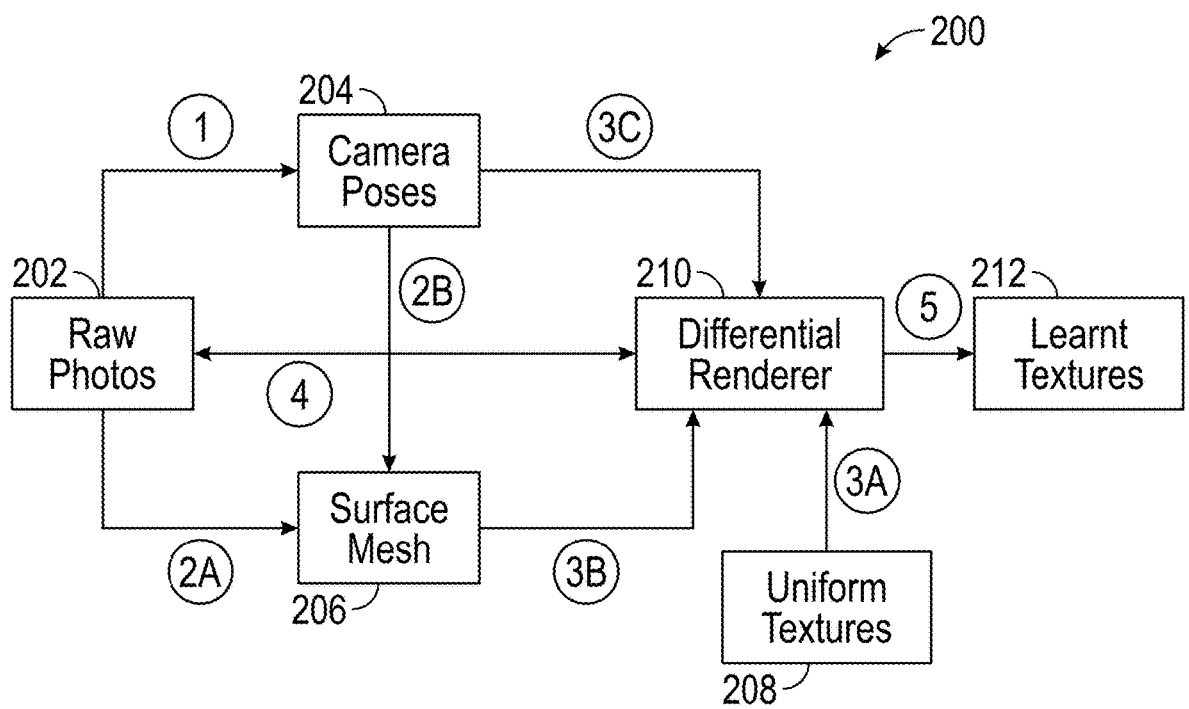
FIG. 2A is a block diagram of a 3D asset reconstruction pipeline.
Figure 2B:
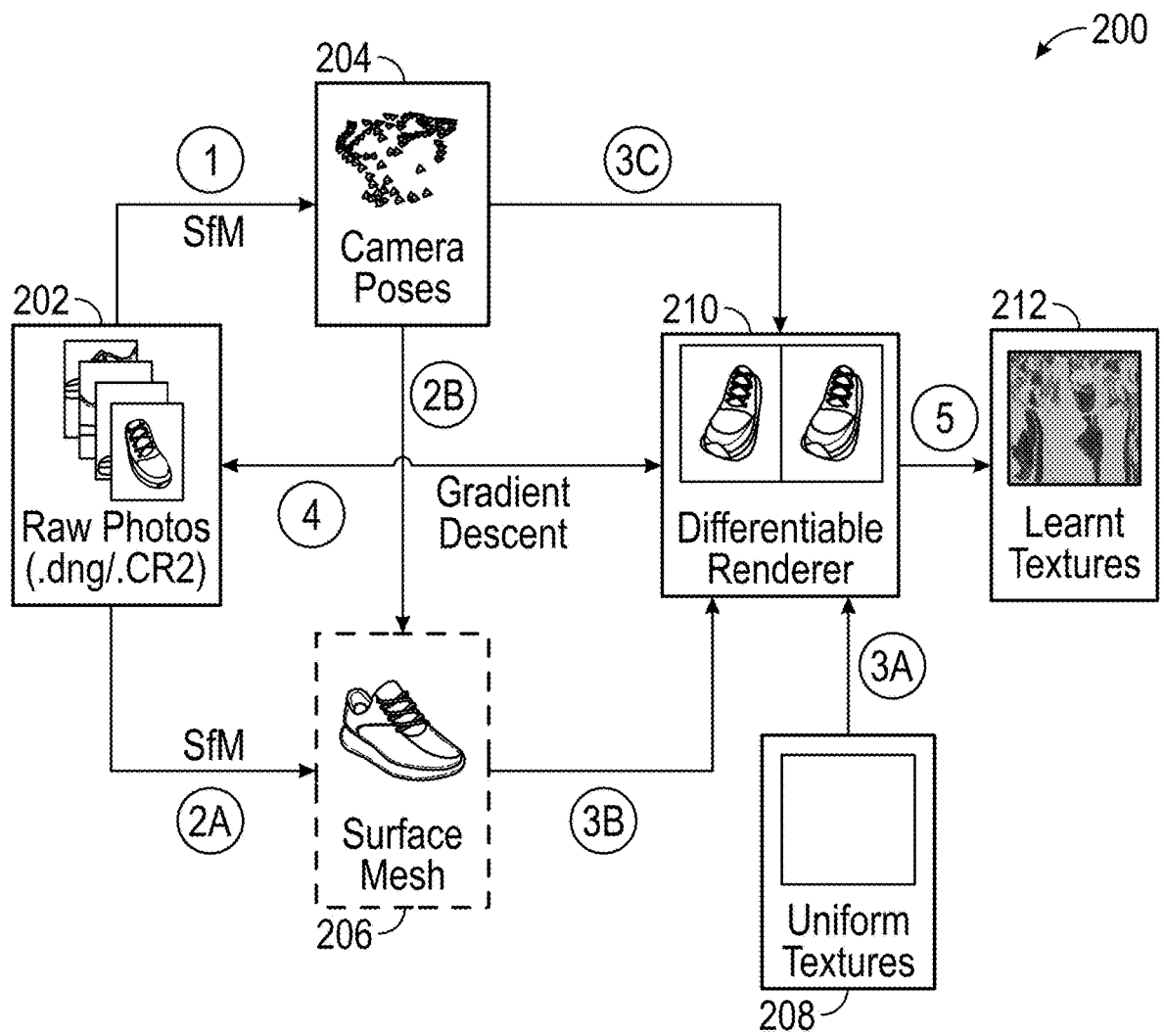
FIG. 2B is an illustration of the 3D asset reconstruction pipeline of FIG. 2A.

FIGS. 2A and 2B depict an example pipeline 200 for 3D asset reconstruction, with FIG. 2A including textual blocks corresponding to functions performed during the reconstruction and FIG. 2B including images corresponding to those textual blocks that visually depict the functionality. Although the pipeline 200 is described with reference to the components of the 3D asset reconstruction system 100, it will be apparent to one of skill in the art how to implement the pipeline using other systems from the description herein.

The camera system 108 captures raw photos 202 of the object 104. The camera system captures a plurality of raw photos 202 (e.g., a few hundred) from different viewpoints surrounding the object 104. Camera poses 204 are determined for each of the raw photos 202. Camera poses may be determined using conventional structure from motion (SfM) algorithms. The computing system 102 then generates a surface mesh 206 for the object 104 using the raw photos 202 and determined camera poses 204. The surface mesh 206 comprises a plurality of surfaces (which are typically triangular) and may be generated using an SfM algorithms (e.g., the SfM used to determine camera poses or another SfM). After generating the initial surface mesh 206, the computing system 102 applies a differential renderer 210 to the surface mesh 206, camera poses 204, and raw photos 202. The differential renderer 210 may be initialized with, for example, predefined texture values (e.g., uniform texture values 208 where all texture properties are set to the same value such as "0" or "1" or non-uniform texture values based on likely materials), pseudo-random texture values, texture values including noise, or a combination thereof that are then refined by the differential renderer 210. In one example, the differential renderer 210 applies a conventional gradient descent algorithm to reduce the difference between the textures of the raw photos 202 and interim texture properties (starting from the initialized texture properties) associated with surfaces making up the surface mesh to produce learned texture properties 212 for respective surfaces of the surface mesh 206. In one example, the learned texture properties 212 are stored as metadata associated with the respective surfaces of the surface mesh 206 to produce the 3D asset.

Figure 3A:
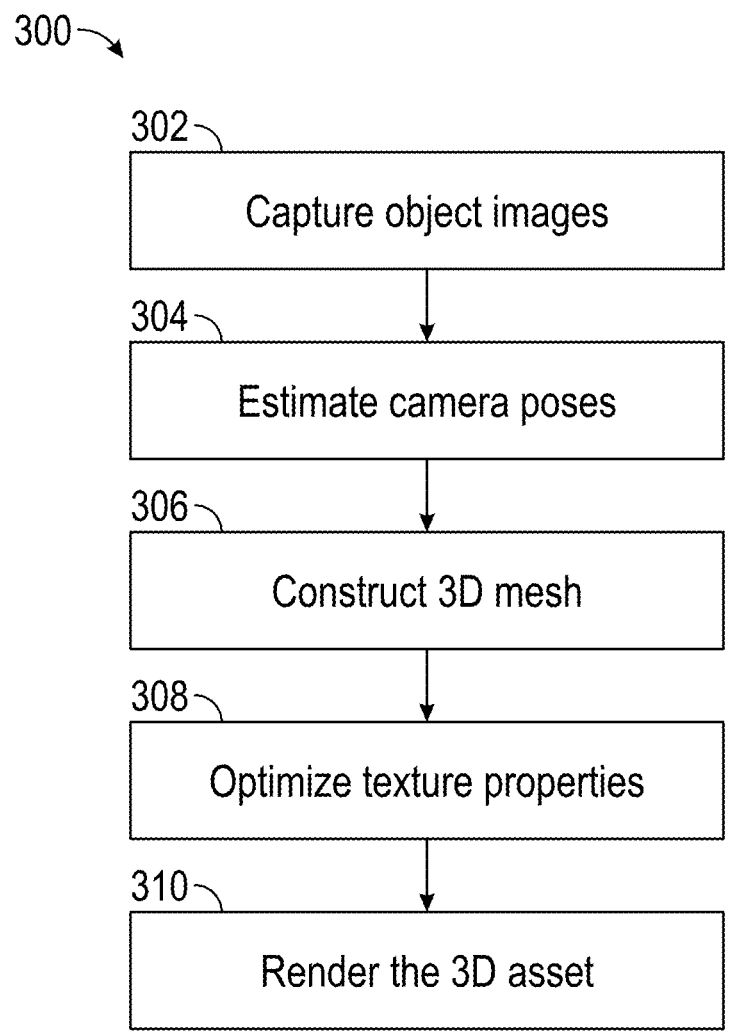
FIG. 3A is a flowchart of a 3D asset reconstruction and rendering method.
Figure 3B:
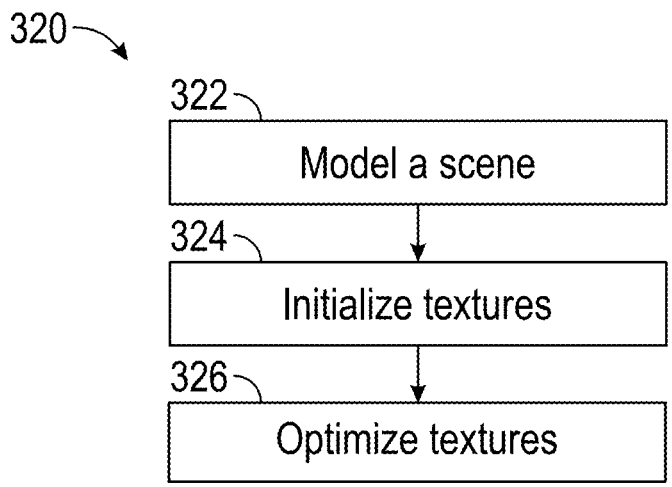
FIG. 3B is a flowchart of a texture determination method for use in the asset reconstruction and rendering method of FIG. 3A.
Figure 3C:
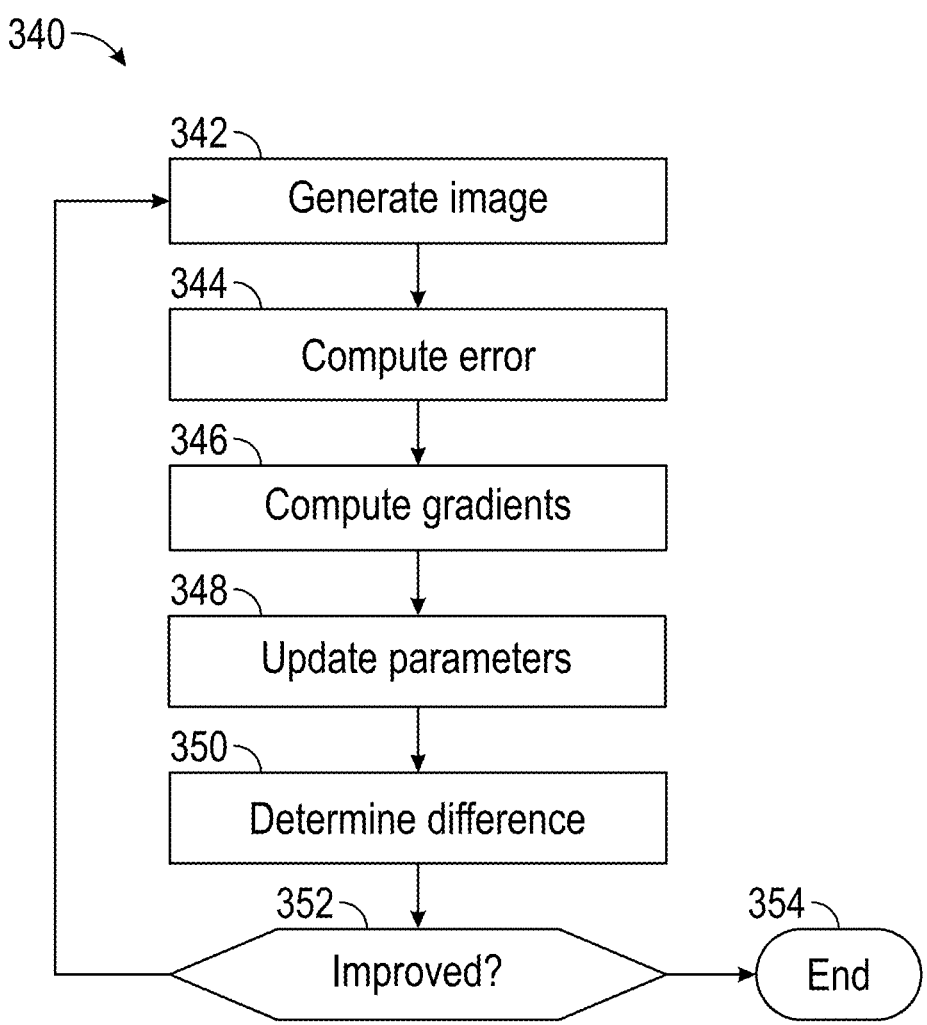
FIG. 3C is a flowchart of a texture refinement method for use in the texture determination method of FIG. 3B.

FIGS. 3A-3C depict flowcharts 300/320/340 of example steps for generating a 3D reconstruction asset for an object. The steps are described with reference to the system 100 and pipeline 200, however, implementation using other systems/pipelines will be understood by one of skill in the art from the description herein. Additionally, it will be understood that one or more steps depicted in the flowcharts may be performed sequentially as shown, out of order, at least substantially simultaneously, or may be omitted depending on the implementation.

Figure 5:
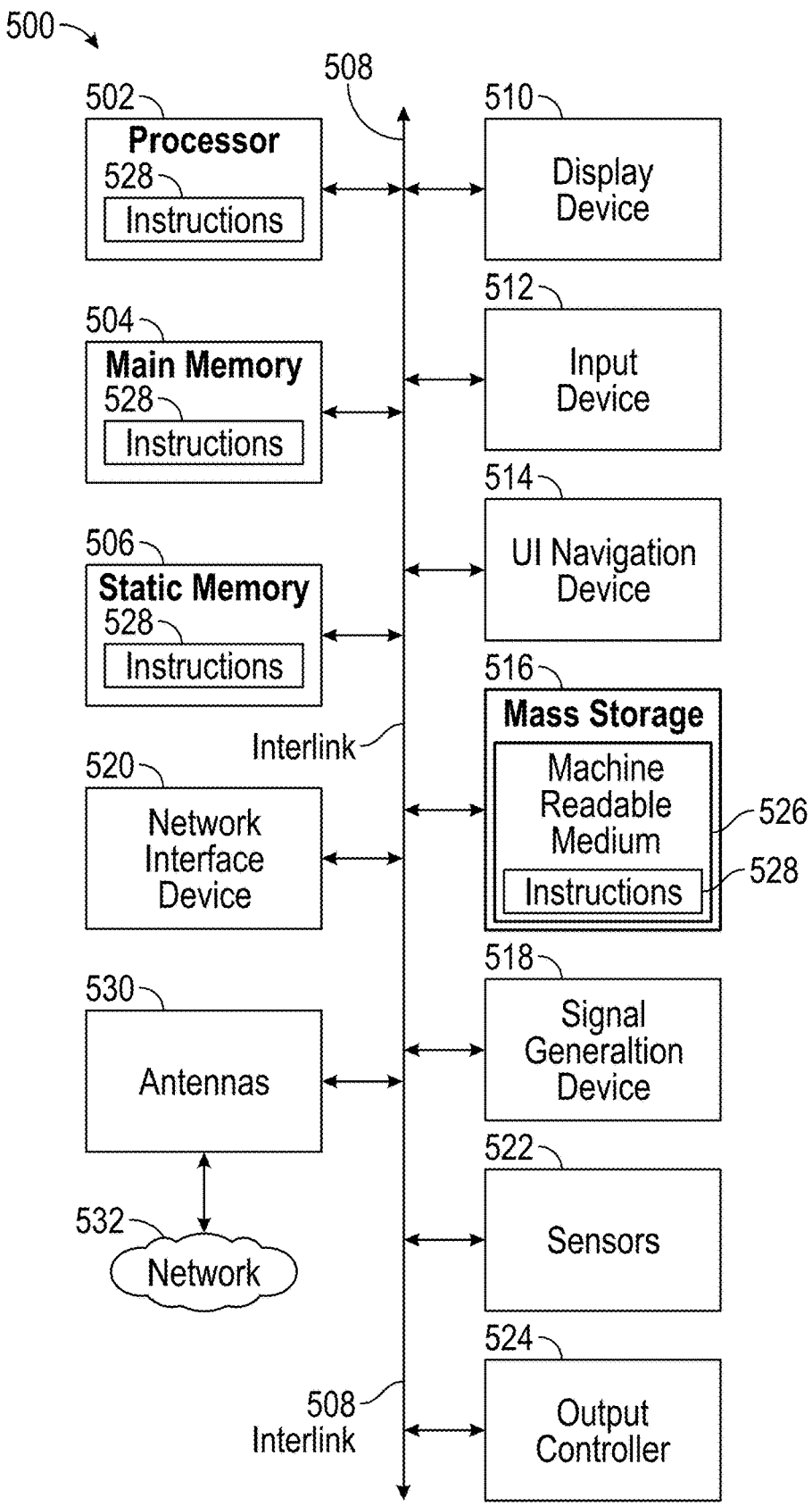
FIG. 5 is a block diagram of a sample configuration of a machine adapted to implement the method of generating 3D assets in accordance with the systems and methods described herein.

Flowchart 300 depicts steps for reconstructing a three-dimensional (3D) asset representing an object. At block 302, the camera system 108 captures images 202 of the object 104 (e.g., a shoe) from different viewpoints (e.g., 400 viewpoints). The camera system 108 may store the images 202 (along with metadata) in a memory (e.g., memory 504; FIG. 5). The computing system 102 may obtain the images 202 directly from the camera system or via the memory. In an example, the images 202 are captured in a darkroom 106. Capturing images 202 in a darkroom 106 where substantially all the light present for illuminating the object 104 originates from a known source location(s) enhances the ability of the differential renderer 210 in determining surface texture properties for the surfaces in the surface mesh 206.

At block 304, the computing system 102 estimates camera poses 204 for each of the captured images 202. In an example, the computing system 102 estimates camera poses 204 by applying an SfM algorithm to the images 202. The SfM algorithm matches each image to adjacent images in an iterative manner to estimate the camera poses 204 for each captured image 202. For example, the SfM algorithm may extract features in the particular image, match the extracted features to extracted features in at least one other image to obtain image correspondence (e.g., a set of points in one image that can be identified as the same points in another image), and estimate the camera pose from the matches and the associated geometric relationships of a combination of features in one image to at least one other image including those features. Images including the same (matching) set of features captured from different viewpoints will have different geometric relationships among that set of features in each image due to their respective viewpoints. The SfM algorithm is able to use these geometric relationships to precisely determine the camera pose for each image by comparing the geometric relationship of a set of features in an image to the geometric relationship of the set of features in at least one other image. The camera pose 204 for each image may be stored in the metadata of that image.

At block 306, the computing system 102 constructs a 3D surface mesh 206. The 3D surface mesh 206 includes surfaces (e.g., triangular surfaces). The computing system 102 constructs the 3D mesh 206 using the captured images 202 and their respective estimated camera poses 204. In an example, the computing system 102 constructs the 3D surface mesh 206 by applying a second SfM algorithm to the images 202 and their respective estimated camera poses 204. The SfM algorithm matches each image to adjacent images in an iterative manner to construct the 3D surface mesh 206 using the captured images 202 and their respective camera poses 204.

In an example, the computing system 102 may additionally receive manual input from a user during or after block 306. For example, if upon visual inspection it is apparent to a user that the surface mesh 206 is not properly modeling the object 104, manual input supplied by the user may be received by the computing system 102 for adjusting vertices of one or more surfaces (e.g., triangles) to model the object 104 more accurately. The computing system may then correct the 3D surface mesh 206 responsive to the manual input.

At block 308, the computing system 102 refines texture properties of the plurality of surfaces of the 3D surface mesh 206 to generate the 3D asset including learned texture properties 212 for the surfaces of the 3D surface mesh 206. In an example, each texture property is stored as a separate parameter for each surface of the 3D surface mesh 206.

In an example, the differential renderer 210 is used to reconstruct texture properties from the captured images 202 to refine the texture properties. The differential renderer 210 enhances scene parameters (e.g., mesh vertices or textures) by minimizing differences between artificially rendered and real-world images. In an example, the difference is modeled by Mean Squared Error (MSE) between real and generated images, which is minimized via gradient descent. This is an iterative process, where the system (1) generates an image/scene from a known camera position, (2) computes MSE between the generated image/scene and a corresponding captured image, (3) computes gradients of MSE by scene parameters, and (4) updates scene parameters (param) in a way that can be roughly described as: param=param−alpha*gradient. Iterations are performed until the loss is minimized and the rendered images start looking the same to the captured images.

Flowchart 320 depicts example steps for a texture determination method for use in the asset reconstruction and rendering method of FIG. 3A. At block 322, the computing system 102 models a scene based on captured images 202. In an example, the computing system 102 models a scene including an object 104 using adjacent captured images 202 to produce a 3D surface mesh 206. At block 324, the computing system 102 initializes texture parameters for each surface of the 3D surface mesh 206. In an example, the computing system 102 initializes the texture parameters by setting the parameter(s) of every surface to predefined values, pseudo-random values, texture values including noise, or a combination thereof. At block 326, the computing system 102 refines the texture parameters, e.g., using the differential renderer 210.

Flowchart 340 depicts example steps for a texture refinement method for use in the texture determination method of FIG. 3B. At block 342, the computing system 102 generates a scene (e.g., an image of one or more surfaces) including an object using the captured images 202. At block 344, the computing system 102 generates an error value for the texture parameters. In an example, the computing system 102 generates texture parameter error values by (1) comparing each parameter of each pixel of a scene/surface(s) to the same parameter in a portion of a region of the captured image 202 corresponding to that pixel/surface and (2) computing a difference therebetween (e.g., a difference for each parameter or a difference between an average of multiple parameters). For example, the computing system 102 may compute the Mean Squared Error (MSE) for the parameters between the pixels of a generated image and a corresponding area of the captured image(s). At block 346, the computing system 102 computes a gradient value representing the generated error values (i.e., gradients of the MSE values) using scene parameters. At block 348, the computing system 102 updates the texture properties for the surface, i.e., to reduce the gradient value and, at block 350, determines the difference between the error/gradient values using the updated parameters and prior to updating the error/gradient values.

At block 352, the computing system 102 checks if the current iteration of the refinement has improved the surface mesh 206 with learned texture properties 212. If the texture properties have not resulted in an improvement (i.e., a determined difference between a texture property/value (or an average of multiple texture properties) in an area of the captured image 202 and a corresponding surface of the 3D surface mesh 206 is greater than the previous iteration; or if a value representing the determined difference is at or below a threshold value), the refinement ends at block 354. Alternatively, if the texture refinement has resulted in an improvement (i.e., the determined difference is less than the previous iteration; or if a value representing the determined difference is above the threshold value), another iteration is performed starting at block 342.

Referring back to FIG. 3A, at block 310, the computing system 102 renders the 3D asset including the learned texture properties 212. The 3D asset may be stored in a memory of a computing system. In an example, the 3D asset is rendered by retrieving the 3D asset from memory, providing a 3D rendering algorithm with the 3D asset and parameters affecting the appearance of textures (e.g., light intensity, direction of light, color/hue of light). In accordance with this example, the computing system 102, executing instructions for implementing the 3D rendering algorithm, applies the parameters to the 3D asset and generates instructions for presenting an image of the 3D asset (as modified based on the parameters) to a user, e.g., on a display visible by the user.

Figure 4A:
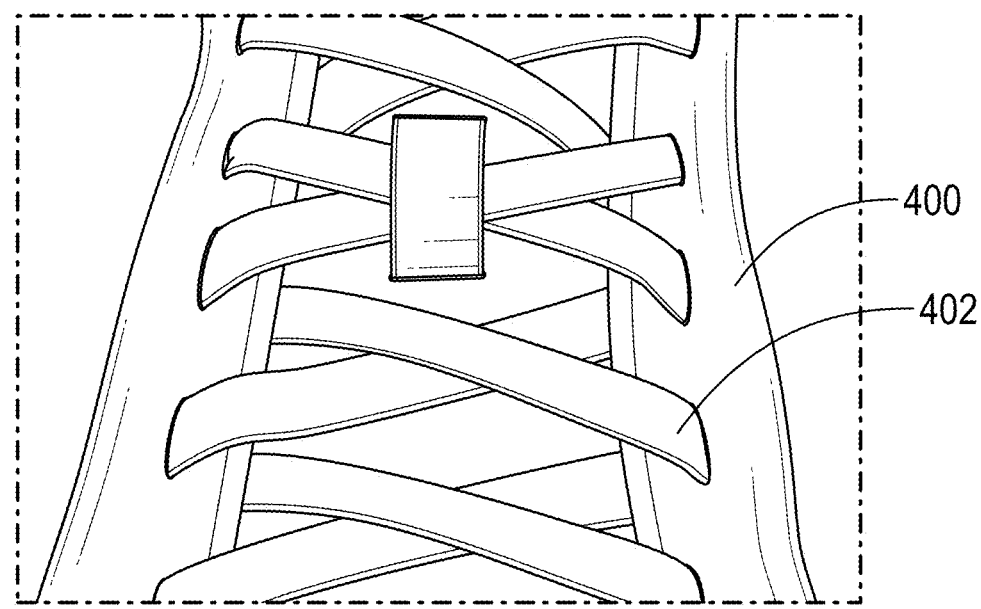
FIG. 4A is an image of a conventional 3D asset.
Figure 4B:
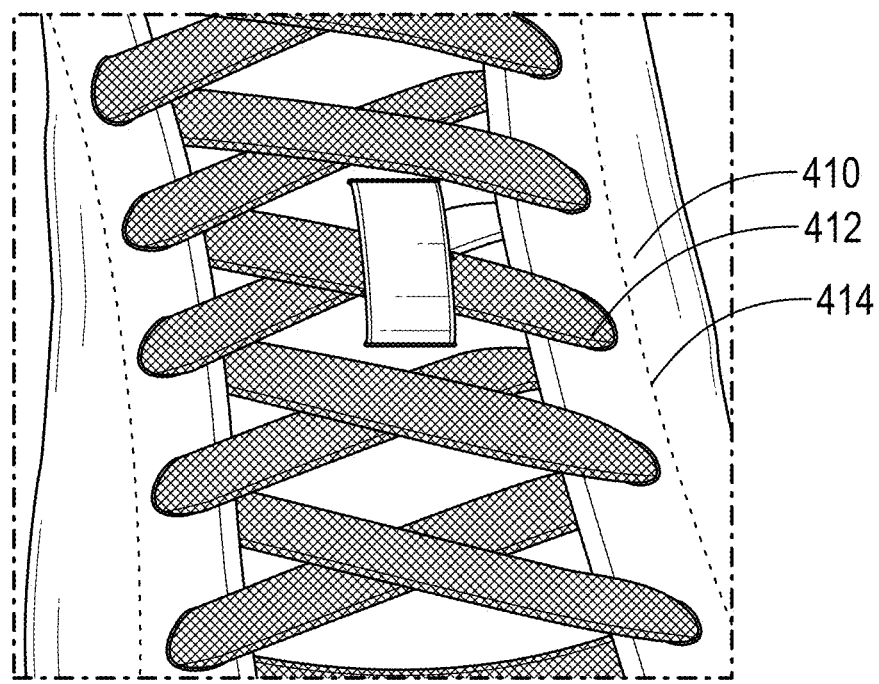
FIG. 4B is an image of a 3D asset reconstructed in accordance with 3D asset reconstruction in accordance with the systems and methods described herein.

FIG. 4A depicts a conventional 3D reconstruction asset 400 produced from a shoe and FIG. 4B depicts a 3D reconstruction asset 410 produced from the same shoe in accordance with the new techniques described herein. The 3D reconstruction asset 410 includes greater and more realistic detail with respect to features of the shoe, e.g., the laces 412 of the 3D reconstruction asset 410 have greater detail than the laces 402 of the conventional 3D reconstruction asset 400. Additionally, the 3D reconstruction asset 410 includes details (such as stitching 414) not present in the conventional 3D reconstruction asset.

Techniques described herein may be used with one or more of the computing systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computing systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computing system. As an example, implementations can include distributed processing, component/object distributed processing, and parallel processing. Moreover, virtual computing system processing can be constructed to implement one or more of the techniques or functionalities, as described herein.

FIG. 5 illustrates an example configuration of a machine 500 including components that may be incorporated into the computing system 102 adapted to manage the 3D asset reconstruction.

In particular, FIG. 5 illustrates a block diagram of an example of a machine 500 upon which one or more configurations may be implemented. In alternative configurations, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. In sample configurations, the machine 500 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 500 may serve as a workstation, a front-end server, or a back-end server of a communication system. Machine 500 may implement the methods described herein by running the software used to implement the features described herein. Further, while only a single machine 500 is illustrated, the term "machine" shall also be taken to include any collection of machines that individually or jointly execute a set (or multiple sets) of instructions to perform any one or more of the methodologies discussed herein.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computing systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computing system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510 (shown as a video display), an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a mass storage device (e.g., drive unit) 516, a signal generation device 518 (e.g., a speaker), a network interface device 520, and one or more sensors 522. Example sensors 522 include one or more of a global positioning system (GPS) sensor, compass, accelerometer, temperature, light, camera, video camera, sensors of physical states or positions, pressure sensors, fingerprint sensors, retina scanners, or other sensors. The machine 500 may include an output controller 524, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 516 may include a machine readable medium 526 on which is stored one or more sets of data structures or instructions 528 (e.g., software) embodying or utilized by any one or more of the techniques or functions described herein. The instructions 528 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine readable media.

While the machine readable medium 526 is illustrated as a single medium, the term "machine readable medium" may include a single medium or multiple media (e.g., at least one of a centralized or distributed database, or associated caches and servers) configured to store the one or more instructions 528. The term "machine readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 528 may further be transmitted or received over communications network 532 using a transmission medium via the network interface device 520. The machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas 530 to connect to the communications network 532. In an example, the network interface device 520 may include a plurality of antennas 530 to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

The features and flowcharts described herein can be embodied in one or more methods as method steps or in one or more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke API calls provided by the operating system to facilitate the functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system or host computer of a service provider into the computer platforms of the smartwatch or other portable electronic devices. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computing system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An asset reconstruction system comprising:
   a plurality of cameras statically positioned within a darkroom, the cameras configured and positioned to capture images of an object positioned within the darkroom from a plurality of viewpoints surrounding the object;
   at least one light source configured to illuminate the object, each light source having a respective location;
   one or more computer processors; and
   a memory storing instructions that, when executed by the one or more computer processors, cause the asset reconstruction system to perform operations for generating a three-dimensional (3D) asset representing the object, the operations comprising:
   capturing a set of images of the object from the plurality of viewpoints surrounding the object with the plurality of cameras statically positioned within the darkroom;
   estimating camera poses for each respective image of the set of images;
   constructing a 3D surface mesh comprising a plurality of surfaces using the set of images and the camera poses estimated for each respective image; and
   optimizing texture properties of the plurality of surfaces of the 3D surface mesh to generate the 3D asset.

2. The asset reconstruction system of claim 1, wherein estimating the camera pose for each respective image of the set of images comprises:
   extracting features from a respective image;
   matching the features extracted from the respective image to features extracted from at least one other image from the set of images to obtain a set of matching features providing image correspondence; and
   estimating a camera pose of the respective image based on the set of matching features and geometric relationships of the set of matching features between the respective image and the at least one other image.

3. The asset reconstruction system of claim 2, wherein constructing the 3D surface mesh comprises:
   applying a structure from motion (SfM) algorithm based on the set of images and the camera pose estimated for each respective image in the set of images.

4. The asset reconstruction system of claim 1, wherein the operations further comprise:
   receiving manual input instructions for the 3D surface mesh; and
   correcting the 3D surface mesh responsive to the manual input instructions.

5. The asset reconstruction system of claim 1, wherein the texture properties include one or more of reflectance, color, or roughness.

6. The asset reconstruction system of claim 5, wherein the operations further comprise:
   storing each of the texture properties as a separate texture parameter.

7. The asset reconstruction system of claim 1, wherein optimizing texture properties of the plurality of surfaces of the 3D surface mesh comprises:
   modeling a scene using the 3D surface mesh, the camera pose estimated for each respective image of the set of images, and the at least one light source;
   initializing the texture properties; and
   optimizing the texture properties using inverse rendering and parameters of the at least one light source until convergence.

8. The asset reconstruction system of claim 7, wherein initializing the texture properties comprises:
   setting all pixels of a respective surface of the 3D surface mesh equal to predefined or pseudo-random values.

9. The asset reconstruction system of claim 7, wherein optimizing the texture properties using inverse rendering and parameters of the at least one light source until convergence comprises:
   generating a portion of the scene from a known camera position;
   computing Mean Squared Error (MSE) between the portion of the scene and a corresponding portion of an image from the set of images; and
   determining that a difference between the portion of the scene and the corresponding portion of the image is less than a threshold difference.

10. An asset reconstruction method for generating a three-dimensional (3D) asset representing an object, the method comprising:
    capturing a set of images of the object from a plurality of viewpoints with a plurality of cameras statically positioned in a darkroom surrounding the object and having at least one light source;
    estimating camera poses for each respective image of the set of images;
    constructing a 3D surface mesh comprising a plurality of surfaces using the set of images and the camera poses estimated for each respective image; and
    optimizing texture properties of the plurality of surfaces of the 3D surface mesh to generate the 3D asset.

11. The asset reconstruction method of claim 10, wherein estimating the camera pose for each respective image of the set of images comprises:
    extracting features from a respective image;
    matching the features extracted from the respective image to features extracted from at least one other image from the set of images to obtain a set of matching features providing image correspondence; and
    estimating a camera pose of the respective image based on the set of matching features and geometric relationships of the set of matching features between the respective image and the at least one other image.

12. The asset reconstruction method of claim 11, wherein constructing the 3D surface mesh comprises:
applying a structure from motion (SfM) algorithm based on the set of images and the camera poses estimated for each respective image in the set of images.

13. The asset reconstruction method of claim 10, further comprising:
receiving manual input instructions for the constructed 3D surface mesh; and
correcting the 3D surface mesh responsive to the manual input instructions.

14. The asset reconstruction method of claim 10, wherein the texture properties include one or more of reflectance, color, or roughness.

15. The asset reconstruction method of claim 14, further comprising:
storing each of the texture properties as a separate texture parameter.

16. The asset reconstruction method of claim 10, wherein optimizing texture properties of the plurality of surfaces of the 3D surface mesh comprises:
modeling a scene using the 3D surface mesh, the camera pose estimated for each respective image of the set of images, and the at least one light source;
initializing the texture properties; and
optimizing the texture properties using inverse rendering and parameters of the at least one light source until convergence.

17. The asset reconstruction method of claim 16, wherein initializing the texture properties comprises:
setting all pixels of a respective surface of the 3D surface mesh equal to predefined or pseudo-random values.

18. The asset reconstruction method of claim 16, wherein optimizing the texture properties using inverse rendering and parameters of the at least one light source until convergence comprises:
generating a portion of the scene from a known camera position;
computing Mean Squared Error (MSE) between the portion of the scene and a corresponding portion of an image from the set of images; and
determining that a difference between the portion of scene and the corresponding portion of the image is less than a threshold.

19. A non-transitory computer-readable storage medium that stores instructions that when executed by at least one processor cause the at least one processor to generate a three-dimensional (3D) asset representing an object by performing operations comprising:
capturing a set of images of the object from a plurality of viewpoints with a plurality of cameras statically positioned in a darkroom surrounding the object and having at least one light source;
estimating camera poses for each respective image of the set of images;
constructing a 3D surface mesh comprising a plurality of surfaces using the set of images and the camera poses estimated for each respective image; and
optimizing texture properties of the plurality of surfaces of the 3D surface mesh to generate the 3D asset.

20. The non-transitory computer-readable storage medium of claim 19, wherein
optimizing texture properties of the plurality of surfaces of the 3D mesh comprises:
modeling a scene using the 3D surface mesh, the camera pose estimated for each respective image of the set of images, and the at least one light source;
initializing the texture properties; and
optimizing the texture properties using inverse rendering and parameters of the at least one light source until convergence.

* * * * *